United States Patent [19]

Fields

[11] Patent Number: 5,420,413
[45] Date of Patent: May 30, 1995

[54] ACTUATOR WITH AN OPTICAL POSITION SENSOR USING A VARIABLE MAGNETIC FIELD

[75] Inventor: Christopher V. Fields, Riveria Beach, Fla.

[73] Assignee: United Technologies Corporation, Hartford, Conn.

[21] Appl. No.: 155,066

[22] Filed: Nov. 19, 1993

Related U.S. Application Data

[63] Continuation-in-part of Ser. No. 997,721, Dec. 31, 1992.

[51] Int. Cl.⁶ .................. H01J 40/14; G01D 5/34
[52] U.S. Cl. .................. 250/214 PR; 250/227.21; 250/231.13; 324/96
[58] Field of Search .............. 250/561, 227.21, 227.23, 250/214 PR, 231.13, 225; 324/96, 207.11, 207.24, 207.25

[56] References Cited

U.S. PATENT DOCUMENTS

| | | | |
|---|---|---|---|
| 4,833,919 | 5/1989 | Saito et al. | 324/207.24 |
| 4,977,316 | 12/1990 | Malcolm et al. | 250/231.13 |
| 5,107,846 | 4/1992 | Atlas | 250/227.21 |
| 5,187,475 | 2/1993 | Wagener et al. | 324/207.11 |

FOREIGN PATENT DOCUMENTS 0092909  6/1983  Japan .................. 324/207.24

Primary Examiner—David C. Nelms
Assistant Examiner—Stephone B. Allen
Attorney, Agent, or Firm—Robert E. Greenstien

[57] ABSTRACT

An actuator having an optical position sensor is disclosed. The sensor remotely provides via a single optic fiber light having two spectral frequencies of about equal intensities to two inversely acting linear optical attenuators that attenuate light in response to the intensity of a magnetic field varied in relation to the movement of the actuator. The attenuated light from each attenuator is filtered producing two attenuated light signals of the two frequencies that are combined in another single optic fiber and then processed into voltages indicative of their intensities. The position of a moving object attached to the attenuators is derived from the difference of the two signals relative to their combined value, minimizing errors associated with obstructions the optical couplings. The attenuators may be orthogonal strips that slide in unison in slots in an elongated rod containing light transmitters and receivers. Light transmittance of the strips varies along their length. The strips are joined as a cartridge that slides within the rod.

12 Claims, 8 Drawing Sheets

ACTUATOR WITH AN OPTICAL POSITION SENSOR USING A VARIABLE MAGNETIC FIELD

This application is a continuation in part of application Ser. No. 07/997,721, filed on Dec. 31, 1992.

TECHNICAL FIELD

This invention relates generally to actuators, in particular, actuators using optical position sensors.

BACKGROUND OF THE INVENTION

An actuator used in jet engine and aircraft control systems should reliably and precisely sense the position of the object that it controls. Often, a position sensor (transducer) is connected to the actuator to accomplish these functions. When an actuator is used in a jet engine or aircraft control system, the sensor sends a signal to a location outside the actuator for display in the cockpit or for processing by electronic controls. Some sensors used in these applications use electromagnetic devices that transmit their output signals as voltages. More recently, optical position sensors using optic fibers for signal transmission have found favor because of their lower weight and insensitivity to disturbance from strong electromagnetic interference.

One type of electromagnetic sensor provides two voltage signals related to the motion of the object being sensed. A first voltage signal ($V_1$) increases linearly with the motion of the object in a first direction, while a second voltage signal ($V_2$) decreases linearly with motion of the object in the same direction. If the sum of the two signals, $V_1+V_2$, is constant, then the position P of the object relative to a fixed point is determined by:

$$K\left(\frac{V_1 - V_2}{V_1 + V_2}\right)$$

where K is a scaling constant.

DISCLOSURE OF THE INVENTION

An object of this invention is providing precision position measurement of an object constrained to motion in one dimension.

It is another object of this invention to provide an actuator having an optical position sensor that is light weight in comparison to electronic sensors.

It is another object of the invention to provide an actuator having a position sensor that is resistant to disturbance from electromagnetic interference, making it particularly suitable to applications in jet aircraft.

It is another object of this invention to provide an optical position sensor that is temperature stable.

According to the invention, broadband light is applied from a common optical line through a pair of linear attenuators first connected to an object. As the object moves in one direction, the intensity that passes through one attenuator increases as the intensity of light passing through the other decreases. The light from each attenuator is filtered to a particular frequency band, and the filtered light from each attenuator is applied to a second common optical line. The second line extends to a detector that provides two electrical signals, each indicative of the intensity of the light of one of the frequency bands The signals are processed to determine the position of the object.

According to the invention, a processor provides the output signal as a function of the first and second signals, according to the equation:

$$P = \frac{K(R_1 - R_2)}{(R_1 + R_2)} \qquad (1)$$

where P is the output signal, K is a scaling constant, $R_1$ is the first signal and $R_2$ is the second signal. Although the intensity of the source light may change, the ratio in equation 1 does not change for a given object position P because $R_1$ and $R_2$ both scale with the source light intensity.

According to the invention, a pair of attenuators are part of a plurality of joined surfaces that slide in slots in an elongated rod or tube as an object moves. The surfaces form a cartridge that slides in the rod. Light transmittance of the surfaces varies along the length of the surface, and the movement of the starface (the cartridge) as the object moves varies the intensity of light transmitted between a transmitter and receiver on the rod.

According to the invention, the other surfaces in the cartridge provide attenuation for redundant optical channels, as well as providing a guide for the cartridge.

According to the invention, each attenuator may comprise a device that polarizes the light and passes the polarized light through a second polarized with a polarization that is variable relative the first polarized as function of the motion of the object, changing the intensity of the light that passes through both polarizers and indicating object location.

A feature of the present invention is that the position signal does not vary with changes in the intensity of the light source.

Another feature of the present invention is that the position signal does not vary with changes in attenuation inherent in the optic connectors that are located between the optic sensor and the processor because the light frequencies are combined on a single optic fiber and are attenuated equally by the optic connectors.

Other objects, benefits and features of the invention will be apparent from the following discussion of one or more embodiments.

DETAILED DESCRIPTION OF THE INVENTION

Figure 1:
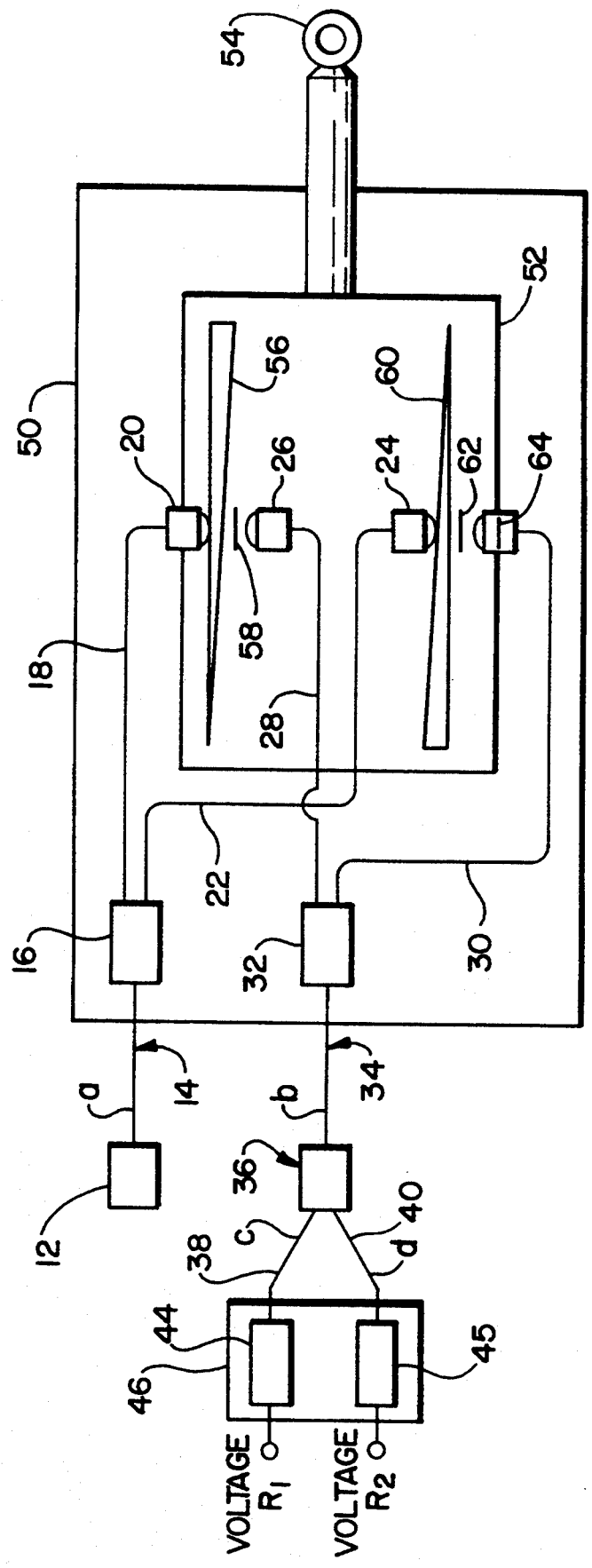
FIG. 1 is a schematic of an actuator system embodying the present invention.

Referring to FIG. 1, an actuator 50 is at a fixed position. A slide plate 52 is attached to an object 54, e.g. a jet engine or aircraft part, that is controlled by the actuator. A light source 12, such as a light emitting diode (LED), is positioned outside the housing (not shown) of the actuator 50. LEDs having a broad spectral intensity maximum are preferred because it is easy to find two different narrow frequency bands, f1 and f2, having about the same intensity. A single optical fiber 14 carries light from the source 12 to a light splitter 16. The splitter 16 is located on or within the actuator 50.

The splitter 16 divides the light input from the optic fiber 14 into a first light path 16.1 and a second light path 16.2. The first light path 16.1 has optic fiber 18 having one end connected to the splitter 16 and the other end connected to illuminating head 20. The second light path 16.2 has optic fiber 22 having one end connected to the splitter 16 and the other end connected to illuminating head 24. Each illuminating head is positioned such that it provides light at a fixed point within the actuator 50. Elongated, linear optical attenuators 56, 60 are located on slide plate 52 that slides back and forth in front of illuminating heads 20, 24 with the motion of object 54. The attenuators 56, 60 are positioned oppositely such that one attenuation increases as the other decreases for a given direction of motion of the object 54. Attenuated light passes through frequency filters 58, 62 that permit only light having about frequencies f1, f2 respectively to pass through. Attenuated, filtered light illuminates receiving heads 26, 64 at other fixed points within the actuator 50. From the receiving heads 26, 64, the light is carded to light combiner 32 by optic fibers 28, 30. The combiner 32 is located on or within the actuator.

The illuminating heads 20, 24 have graduated index of refraction (GRIN) lenses for broadening the light illuminating the attenuators 56, 60. The receiving heads 26, 64 also have GRIN lenses for narrowing the beams of attenuated, filtered light onto optic fibers 28, 30.

Light from combiner 32 is carded to a dichroic splitter 36 located remotely from the actuator by an optic fiber 34. The dichroic splitter 32 divides the light from the combiner 32 into the separate frequency components f1 and f2. The two frequency components f1 and f2 are separately fed onto separate optic detectors 44 and 45 in a signal processor 46 via optic fibers 38 and 40. The processor 46 converts the inputed light signals into two voltage signals, RI and R2, proportional to the intensity of light of frequencies f1 and f2, respectively. Using known computer signal processing (e.g. a microprocessor), the processor 46 then derives the position of the object 54 using, for example, equation 1, above.

Figure 2:
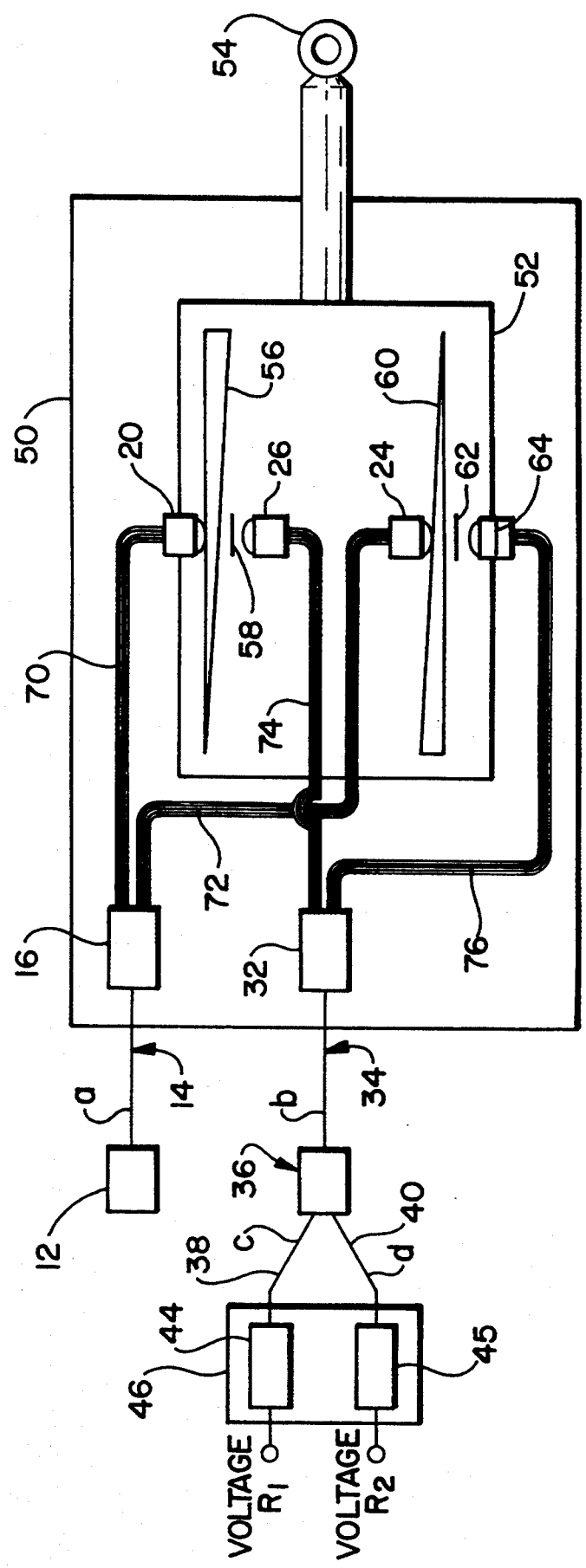
FIG. 2 is a schematic of an actuator using a second embodiment of the present invention.

FIG. 4 shows four plots of intensity vs. frequency at locations a, b, c, and d indicated in FIGS. 1 and 2. FIG. 4a shows the frequency spectrum of light radiated by the light source 12. FIG. 4b shows the frequency spectrum of the light returning from actuator 50 in line 34. FIG. 4c shows the frequency spectrum of the light impinging on optic detector 44, and FIG. 4d shows the frequency spectrum of light falling on optic detector 45.

Figure 3:
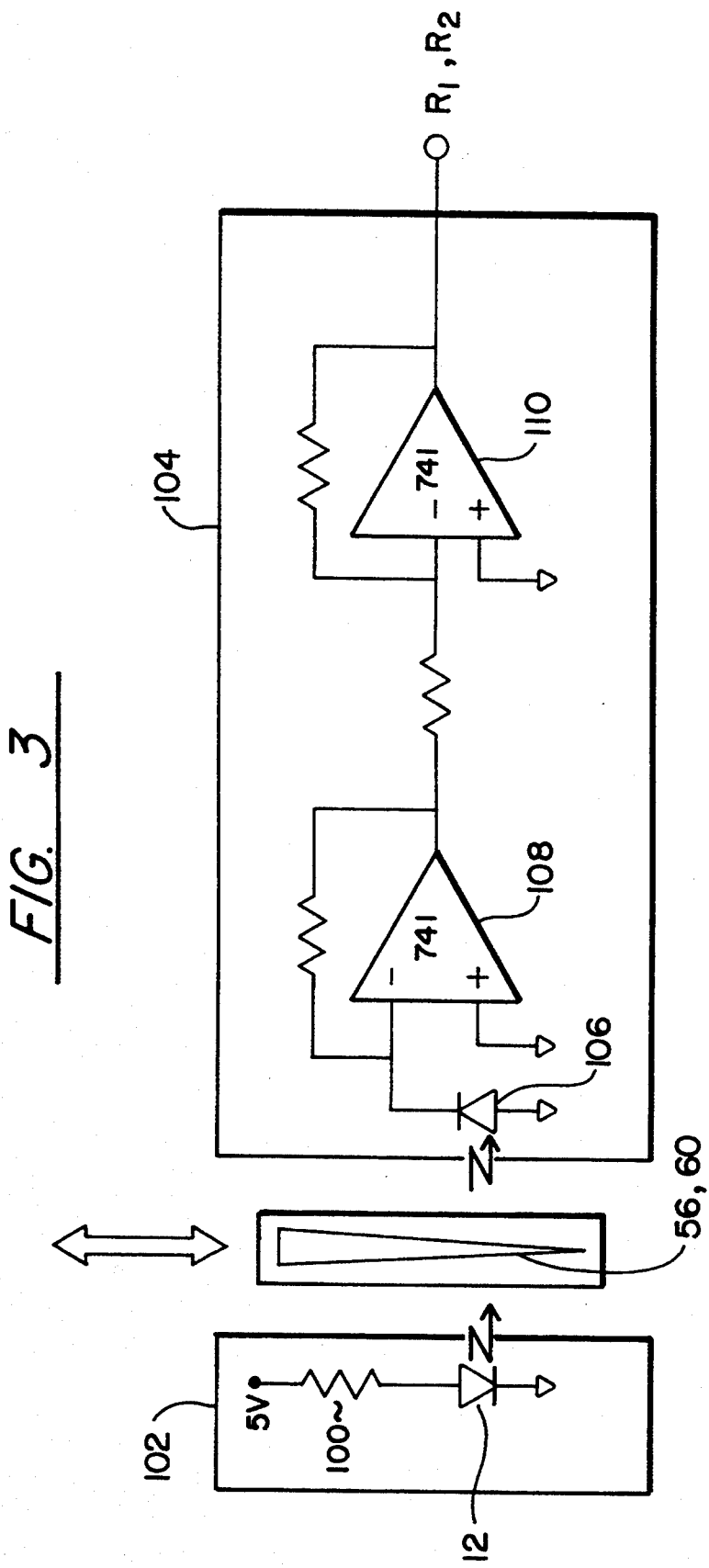
FIG. 3 is functional block diagram of an optical sensor with a linear attenuator.
Figure 4A:
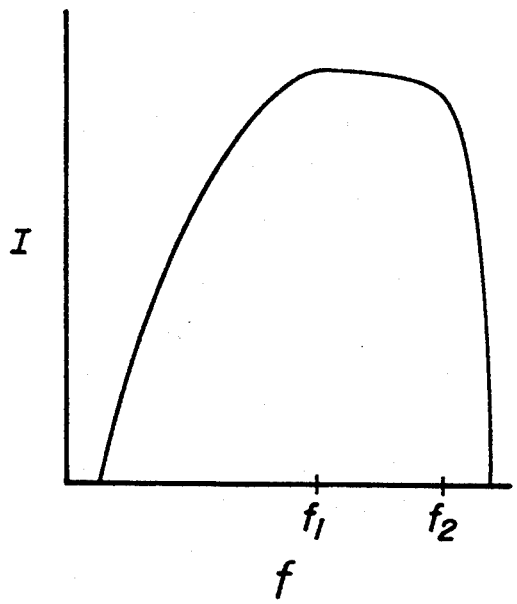
FIG. 4 shows plots of light intensity as a function of frequency of the light signals at different optical locations in the motion sensor shown in FIG. 1 and 2.
Figure 4B:
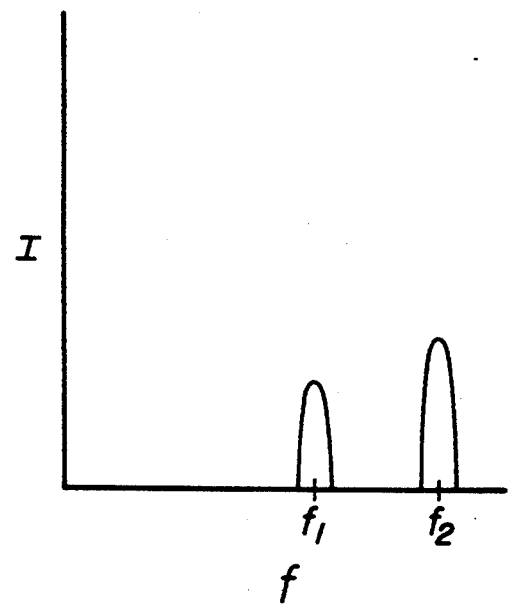
Figure 4C:
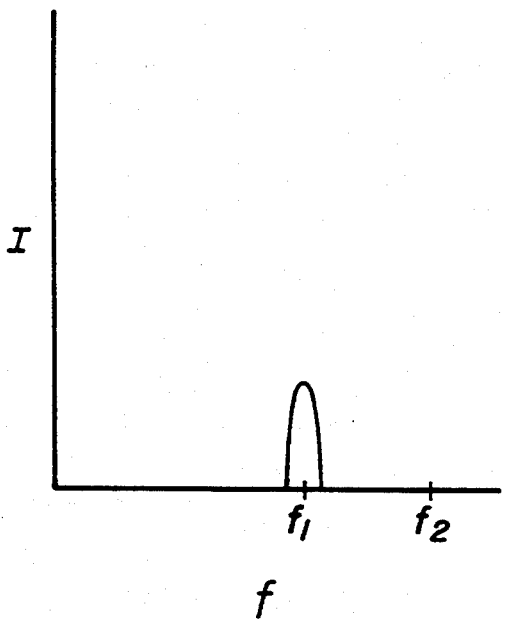
Figure 4D:
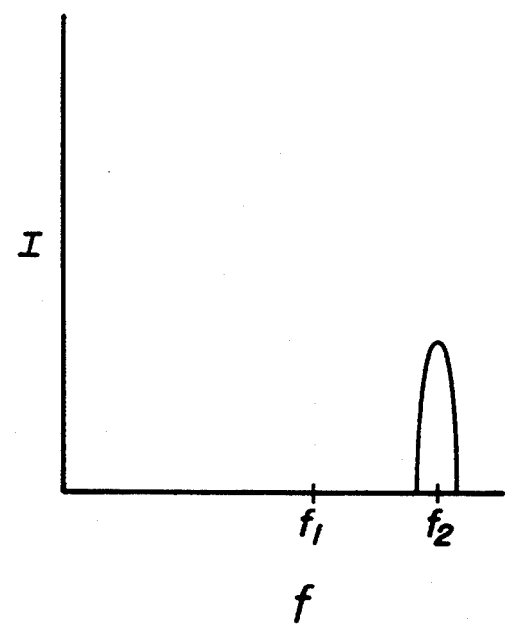

FIG. 3 shows a schematic of the opto-electronics for a single frequency channel. There, the light source means 102 comprises a LED 12. The processor 104 comprises a light sensitive diode 106 and amplifiers 108, 110.

A second embodiment of this invention is displayed in FIG. 2. The optic fibers 18, 22, 28 and 30 are in this case replaced by bundles of optic fibers 70, 72, 74 and 76, respectively. The individual optic fiber ends may be positioned in a linear array at illuminating ends 20, 24, to widen the illumination light beam. A wide illumination light beam allows larger and less critical geometries in the construction of the attenuators 50, 60. However, optic fibers 14 and 34 remain single fibers in all embodiments. This assures that the intensities of both light frequencies, f1 and f2, illuminating the attenuators will scale together, regardless of variations in the source light intensity or dirt in the optic fiber connections outside the actuator.

Figure 5:
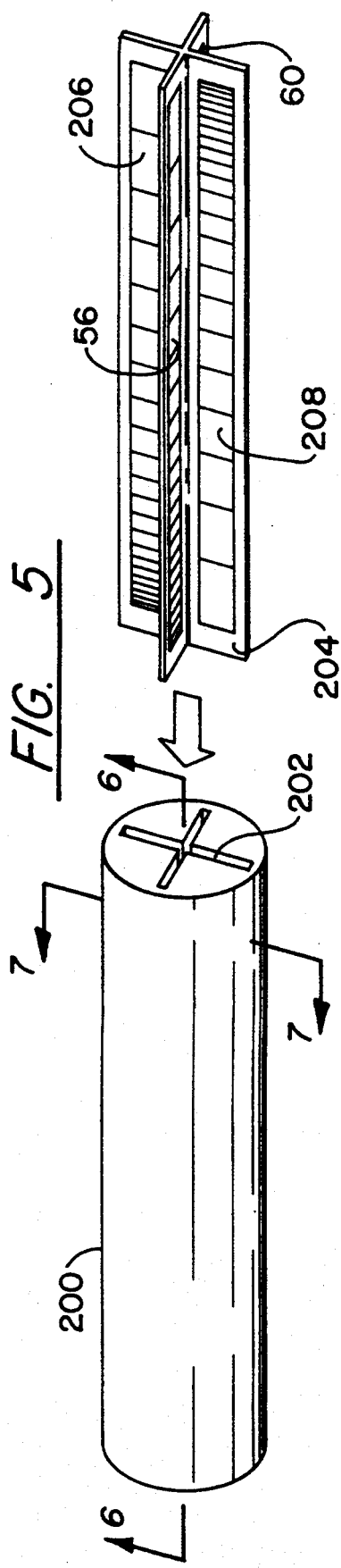
FIG. 5 is an exploded perspective of a sensor body, guide plate and attenuators.
Figure 7:
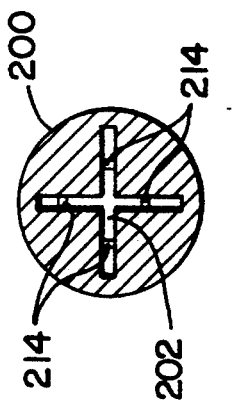
FIG. 7 is a section along the line 7—7 in FIG. 5.
Figure 6:
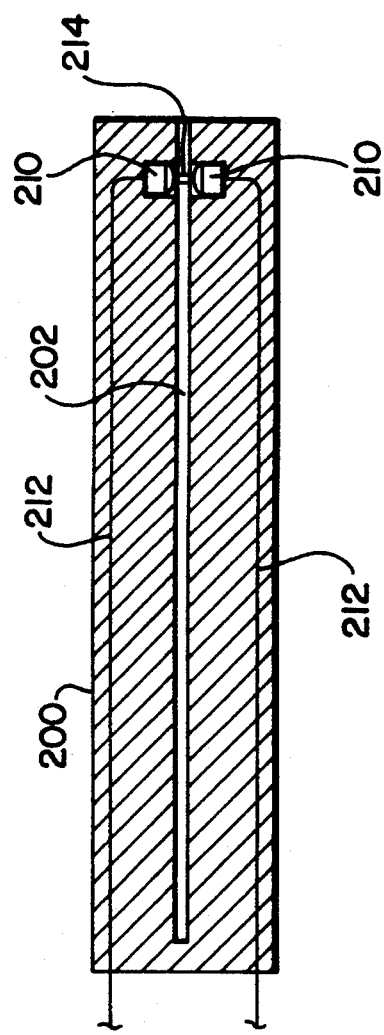
FIG. 6 is a section along the line 6—6 in FIG. 5.

In jet engine and aircraft control applications, it is important to have redundant systems. FIG. 5 displays part of a sensor having two pairs of attenuators for redundancy. A cylindrical sensor body 200 has a longitudinal slot 202 extending for most of its length. The slot 202 has a cross shaped cross section. The slide member 204 having the two pairs of attenuators 206, 208 and 56, 60 mounted on it also has a cross shaped cross section. FIGS. 6 and 7 show that the illuminating heads 210 and receiving heads 216 are all located at the same axial position in the sensor body 200. The light paths 214 for this type of attenuator cross the arms of the slot.

Figure 8:
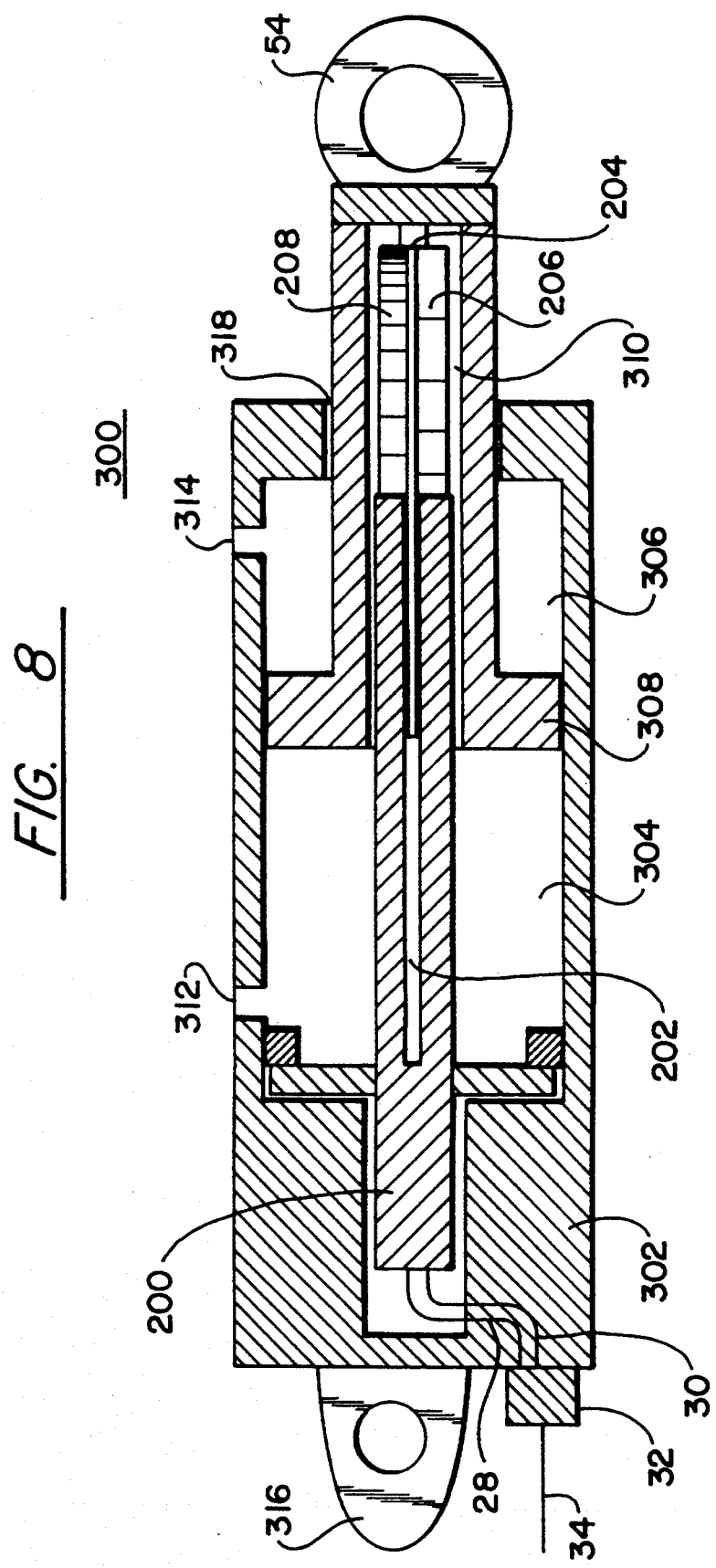
FIG. 8 is a cross section of an actuator of this invention embodying the sensor shown in FIG. 5.

The sensor body 200 and slide plate 204 of the type shown in FIG. 5 can be mounted in existing actuators, as shown in FIG. 8. The actuator 300 has a housing 302 having a cylindrical chamber within it. The actuator is attached to a non-moving part of the engine or aircraft control by a fastener 316. The chamber is divided by a sliding piston 308 into a first subchamber 304 and a second subchamber 306. The subchambers 304, 306 are filled with a nonopaque hydraulic fluid, such as oil or fuel. Subchambers 304 and 306 communicate with hydraulic systems (not shown) via ports 312 and 314 respectively. The piston 308 extends outside the housing 302 through an opening 318 at one end, and attaches to the moving object 54. The piston 308 has an axial bore 310 extending most of its length. The slide plate 204 having the attenuators 206, 208, 56, 60 mounted on it is attached to the end wall of the bore 310. The sensor body 200 is attached to the end wall of the first subchamber 304 opposing the piston 308. The sensor body 200 extends into the piston bore 310, its slot 202 slidably engaging the slide plate 204 as the piston 308 moves.

There are numerous possible variations of elongated, linear optical attenuators for attenuators 56, 60, 206, 208. Among them are: optical gratings with variable line spacings; elongated, wedge shaped slots; elongated, tapered, optical obstructions; attenuators having a first polarizing material having a first polarization angle and a second polarizing material having a second polarization angle, characterized in that the angle between the first polarization angle and the second polarization angle varies along the length of each attenuator; and elongated wedge shaped reflective surfaces; reflective surfaces with reflectivity that varies with length.

Figure 9:
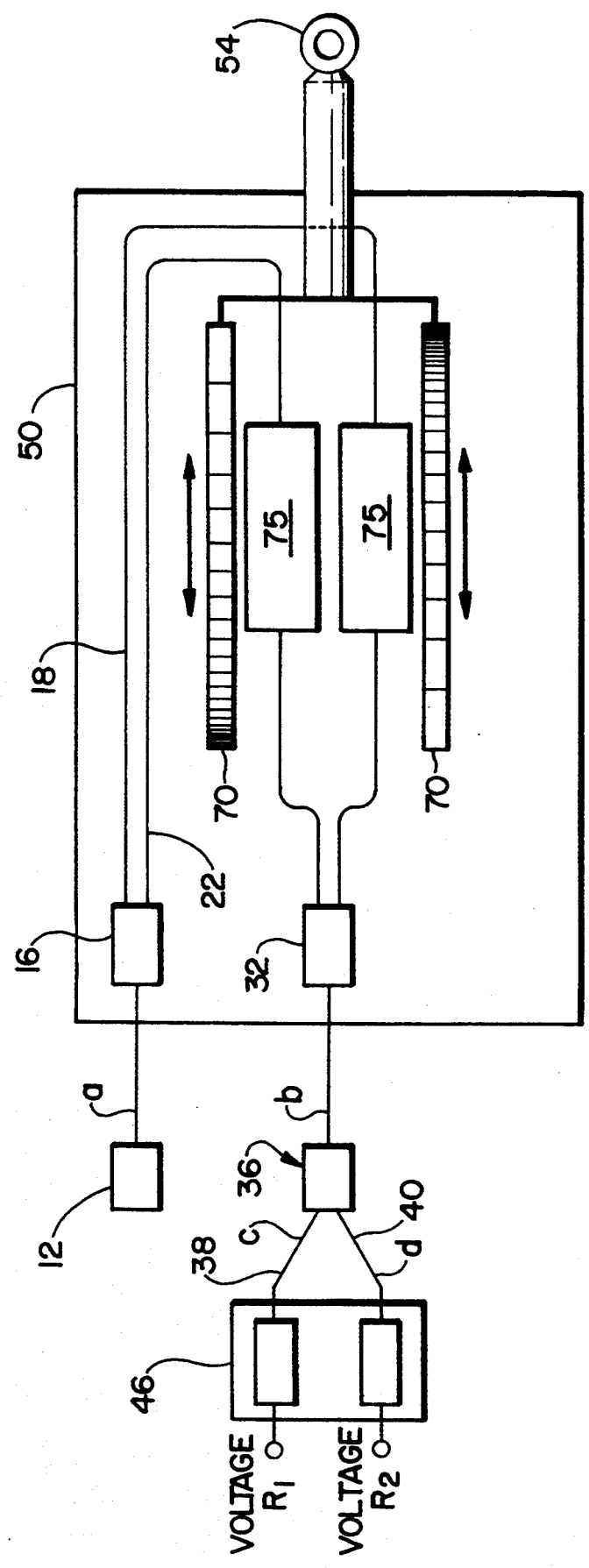
FIG. 9 is a functional block diagram of another embodiment of the present invention in which polarizers are used to attenuate the light in the optical channels.
Figure 10:
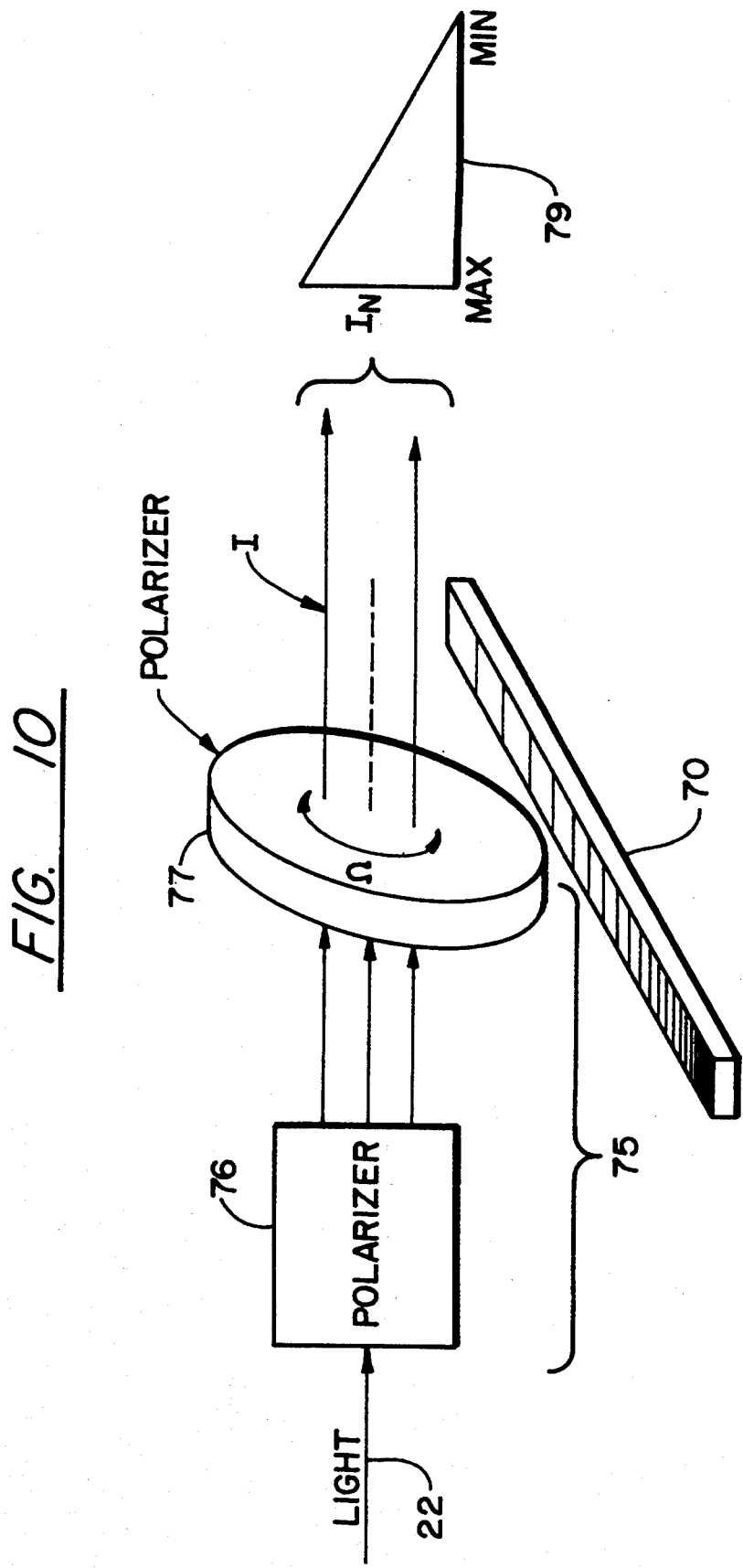
FIG. 10 is a simplified block diagram of an optical attenuator using polarizers, as shown in FIG. 9.

FIG. 9 shows an embodiment of the invention that allows for sealed optical channels, giving the system better applicability in harsh environments, for instance, on an actuator that is part of a gas turbine engine. In FIG. 9, the motion of the object 54 is used to move two magnetic strips 70. Each strip is magnetized so that the magnetic intensity varies along the length of the strip from a minimum (MIN) to maximum (MAX) field strength. This is symbolically shown by the density of the lines on each strip 70, each line representing a magnetic dipole, in effect. As before, the light in each fiber 18, 22 is attenuated in reaching the detector 32 by the movement of the object 54, but in this embodiment the motion of the strip is used to control the transmissivity of a polarization attenuators 75, such as the commercial available type SK071691-002 available from Simmonds Industries and type LS-B3 available from Allied Signal Corporation. Finally, FIG. 10 shows that each attenuator 75 contains a polarizer 76 which polarizes the light on the fiber 22 in one direction, for instance horizontally. The magnetic strip 70 rotates the angle $\Omega$ of the polarizing plane of another polarizer or polarized lens or filter 77, producing a variable polarization angle relative to lens 76, so that the intensity of the light I will vary between MIN and MAX.

In addition to the foregoing, one skilled in the art may be able to make modifications and variations in whole or in part, to the previously explained embodiments without departing from the true scope and spirit of the invention.

I claim:

1. An actuator comprising sensor means for indicating the position of an object constrained to move in one dimension between first and second positions, characterized by:
   light source means for illuminating a first point and a second point with light comprising a first frequency and a second frequency different from the first frequency, the first and second frequencies having about equal intensity;
   first attenuation means for illuminating a third point with light originating from the first point, the intensity of the illumination at the third point linearly decreasing with a change of position of the object in a first direction;
   second attenuation means for illuminating a fourth point with light originating from the second point, the intensity of the illumination at the fourth point linearly decreasing with a change of position of the object in a second direction opposite the first direction;
   receiver means for providing a first signal indicative of the intensity of light of the first frequency illuminating the third point and a second signal indicative of the intensity of light of the second frequency illuminating the fourth point;
   processing means for providing a third signal indicative of the position of the object as a function of the first and second signal;
   the first and second attenuator means comprising means responsive to a varying magnetic field to vary light attenuation; and
   means individual to the first and second attenuators for providing an inversely varying magnetic field to an actuator in response to movement of the object.

2. The actuator of claim 1, further characterized in that the first and second attenuation means each comprise means for polarizing light in a first direction and passing the light through a polarizer having a moveable polarizing plane that responds to a magnetic field, to produce output light as a function of the magnetic field strength.

3. The actuator of claim 2, further characterized in that the light source means comprises:
   a light source;
   a light splitter connected to the light source by a first optic fiber;
   a second optic fiber connected at a first end to the light splitter for carrying light to the first point; and
   a third optic fiber connected at a first end to the light splitter for carrying light to the second point.

4. The actuator of claim 3, further characterized in that the light source means further comprises:
   a first illuminating head connected to a second end of the second optic fiber for broadening light illuminating the first point; and
   a second illuminating head connected to a second end of third optic fiber for broadening light illuminating the second point.

5. The actuator of claim 4, further characterized in that the receiver means further comprises:
   combining means for combining light illuminating the third point with light illuminating the fourth point, to form a combined light signal; and
   dichroic means for producing the first and second signs from the combined light signal.

6. The actuator of claim 5, further characterized in that the receiver means further comprises:
   a fourth optic fiber connected at a first end to the combining means for carrying light from the third point to the combining means;
   a fifth optic fiber connected at a first end to the combining means for carrying light from the fourth point to the combining means; and
   a sixth optic fiber connecting the dichroic means and the combining means.

7. The actuator of claim 6, further characterized in that the receiver means further comprises:
   a first receiving head for narrowing the light illuminating the third point connected to a second end of the fourth optic fiber; and
   a second receiving head for narrowing the light illuminating the fourth point connected to a second end of the fifth optic fiber.

8. The actuator of claim 7, further characterized in that the means for providing the magnetic field comprises an elongated strip with a linearly increasing magnetic field between first and second ends of the strip.

9. The actuator of claim 2, further characterized in that the sensor means is further characterized by:
   a first filter means for permitting only light of about the first frequency to illuminate the third point, located in a first light path defined by the first point, the first attenuator means and the third point; and
   a second filter means for permitting only light of about the second frequency to illuminate the fourth point, located in a second light path defined by the second point, the second attenuator means and the fourth point.

10. The actuator of claim 9, further characterized in that the means for providing the magnetic field comprises an elongated strip with a linearly increasing magnetic field strength between first and second ends of the strip.

11. The actuator of claim 2, further characterized in that the means for providing the magnetic field comprises an elongated strip with a linearly increasing magnetic field strength between first and second ends of the strip.

12. A position transducer having a first pair of optical channels comprising means for inversely varying the magnitude of light simultaneously with the displacement of an object, characterized by:

an elongated rod having a plurality of parallel slots extending substantially between two ends of the rod, the slots being angularly disposed around a longitudinal axis of the rod;

a plurality of surfaces joined together along a line that is concentric with the longitudinal axis, each of the surfaces being located within a slot and the surfaces being moveable in their respective slots;

at least two surfaces comprising material with light transmittance that varies along the length of the surface in a direction in which the surface slots on the rod; and a pair of optical transmitters and receivers, each of the two surfaces being located between one optical transmitter and receiver.

* * * * *